(12) United States Patent
Potineni et al.

(10) Patent No.: US 10,028,104 B2
(45) Date of Patent: Jul. 17, 2018

(54) SYSTEM AND METHOD FOR GUIDED EMERGENCY EXIT

(75) Inventors: Rajesh Chandra Potineni, Hyderabad (IN); Joe Ben Alphonse, Gurgaon (IN); Bineesh Av, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1835 days.

(21) Appl. No.: 13/415,562

(22) Filed: Mar. 8, 2012

(65) Prior Publication Data

US 2013/0237179 A1 Sep. 12, 2013

(51) Int. Cl.
| | |
|---|---|
| G01C 21/20 | (2006.01) |
| G01B 7/06 | (2006.01) |
| H04W 4/90 | (2018.01) |
| H04W 4/04 | (2009.01) |
| G01S 5/00 | (2006.01) |
| G08B 7/06 | (2006.01) |

(52) U.S. Cl.
CPC .......... *H04W 4/043* (2013.01); *G01C 21/206* (2013.01); *G01S 5/0045* (2013.01); *G08B 7/066* (2013.01); *H04W 4/90* (2018.02)

(58) Field of Classification Search
CPC ................. H04W 4/22; H04W 76/007; H04W 4/02–4/029; H04W 64/00; H04W 64/006; H04W 4/12; H04M 2242/04; H04M 2207/18; H04M 2242/30; H04M 2250/10; H04M 1/6091; H04M 1/72538; H04M 1/72552; H04M 1/72572; H04M 2242/14; H04M 2242/15; H04M 2250/02; H04M 3/00; H04M 3/5116; G01S 5/0045; G08B 7/066
USPC ....................................... 455/404.2
See application file for complete search history.

(56) References Cited

U.S. PATENT DOCUMENTS

| | | | |
|---|---|---|---|
| 2009/0062975 A1* | 3/2009 | Strzeletz .......................... 701/26 |
| 2009/0138353 A1* | 5/2009 | Mendelson ...................... 705/14 |
| 2010/0167687 A1* | 7/2010 | Morrey et al. ............. 455/404.1 |
| 2013/0103309 A1* | 4/2013 | Cai et al. ...................... 701/515 |

* cited by examiner

*Primary Examiner* — George Eng
*Assistant Examiner* — Jing Gao
(74) *Attorney, Agent, or Firm* — Wood, Phillips, Katz, Clark & Mortimer

(57) ABSTRACT

A system and method (10) are shown for providing a guided emergency exit to personnel (12) within a building (14), and includes the steps of: automatically determining the location of each of a plurality of wireless communication devices (22) within a building in response to an emergency, each of the communication devices being assigned to a person (12); determining an escape route (28) from the building for each of the communication devices based on the location of the communication device (22) and the available paths (20) from that location to a safe exit (29); and wirelessly transmitting a sequential series of images to each of the communication devices to guide the person assigned to the device from checkpoint (18) to checkpoint along the escape route (28) until the person (12) safely exits.

2 Claims, 3 Drawing Sheets

SYSTEM AND METHOD FOR GUIDED EMERGENCY EXIT

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

This disclosure is related to systems and methods for helping personnel to evacuate buildings and/or other facilities during an emergency situation.

BACKGROUND

With the growing concerns in the safety of the people in a building or any structure, there is a need for faster evacuation in case of emergencies like fire or earthquake etc.

Current methods of guiding people to the emergency exits include overhead signs or an escape route map. There are several disadvantages to these methods. For example, maps often point to one and only one way of getting to the emergency exit and will fail to serve the intended purpose if the shown escape route is compromised or not safe. As another example, signs may not be visible at all times or they may fall off as the result of the emergency event. For example, if there is a fire, there are fair chances that at least some of the overhead signs may get burnt or fall from their positions or be hidden by smoke. Even maps placed at various locations may be destroyed in a fire. All of these scenarios could result in people in the building not being able to exit the building to safety because they will be unaware as to which way they need to go to reach the emergency exit.

SUMMARY

In accordance with one feature of this disclosure, a secure central server provides data to mobile devices carried by all the people within a building. All the escape routes from the building will be loaded into the server in the form of real life images of the route and can be transmitted to all the mobile devices in case of any emergency. Along with the primary escape routes, alternate routes will also be configured in the server so that these routes can be transmitted in case a primary route has been compromised. The mobile device shows the real-life image of the route to be followed, thereby allowing the users to immediately recognize the route that they need to take.

As one feature, the server can be updated with the latest data in regular intervals either manually or automatically using cameras at specific locations. The latest updated route will be available to the users all the time since the routes come from a central location which will have the updated routes.

In accordance with one feature of the disclosure, a system is shown for providing a guided emergency exit to personnel within a building. The system includes a plurality of wireless transceivers located at checkpoints spaced throughout the building. The checkpoints are connected by paths that can be navigated by personnel in the building to exit the building. The system further includes a plurality of handheld wireless communication devices, each communication device including a visual display and being assigned to a person within the building, and a central server in operable association with the wireless transceivers to communicate information to and from each of the communication devices via the wireless transceivers. The server is configured to determine the location of each communication device within the building in the case of an emergency and to communicate a sequential set of visual images of an escape route via the wireless transceivers to each of the communication devices to lead the person carrying the communication device from checkpoint to checkpoint along the escape route until the person exits the building.

In one feature, the central server is configured to determine a location of each of the communication devices based upon which one of the transceivers is communicating wirelessly with the communication device, to communicate a visual image of the sequential set based on the determined location via the one of the transceivers to the communication device, and to communicate a new visual image from the sequence via another one of the transceivers to the communication device in response to the one of the wireless transceivers losing the ability to communicate wirelessly with the communication device.

As one feature, the central server is configured to continue to repeatedly communicate a visual image associated with one of the wireless transceivers to a communication device as long as the one of the wireless transceivers is able to communicate with the communication device.

According to one feature, the central server is further configured to communicate a message to the communication device urging the person assigned to the communication device to hurry as long as the one of the wireless transceivers is able to communicate with the communication device.

As one feature, the system further comprises an electronic database accessible by the central server, the electronic database containing images of each checkpoint and images of each path connecting the checkpoints.

In one feature, the central server is configured to determine a primary escape route from the building for each of the communication devices based on the location of each communication device within the building and, for each communication device, to communicate a sequential set of the images of the checkpoints and paths between the checkpoints along the primary escape route to the communication device via the wireless transceivers.

According to one feature, the central server is configured to determine an alternate escape route in response to an indication that the primary escape route for a communication device is compromised, and to communicate to the communication device via the wireless transceivers a sequential set of the images of the checkpoints and paths between the checkpoints along the alternate escape route.

In one feature, the central server is configured to disable the transceivers along an escape route in response to an indication that the escape route is no longer viable.

As one feature, each of the communication devices has a unique identifier assigned to it and the central server is configured to associate each of the handheld wireless communications devices with the unique identifier assigned to the handheld wireless communications device.

In one feature, each of the communication devices is configured so that wireless communications with the transceivers is always enabled.

According to one feature, the central server is configured to determine which of a plurality of wireless communications protocols are enabled for each communications device and to select a preferred one of the plurality of wireless communications protocols for use in communicating information to and from each of the communication devices via the wireless transceivers.

In accordance with one feature of the disclosure, a method is shown for providing a guided emergency exit to personnel within a building. The method includes the steps of automatically determining the location of each of a plurality of wireless communication devices within a building in response to an emergency, each of the communication devices being assigned to a person; determining an escape route from the building for each of the communication devices based on the location of the communication device within the building and the available paths from that location to a safe exit from the building; and wirelessly transmitting a sequential series of images to each of the communication devices to guide the person assigned to the device from checkpoint to checkpoint along the escape route until the person safely exits the building.

As one feature, the step of wirelessly transmitting includes sequentially transmitting the sequential series of images from transceivers corresponding to the checkpoints, each transceiver transmitting one of the images corresponding to a path from the checkpoint corresponding to the transceiver to the next checkpoint along the escape route.

As one feature, the step of wirelessly transmitting further includes transmitting a new image to one of the communication devices every time one of the wireless transceivers along the escape route loses the capability to communicate with the communication device.

According to one feature, the method further includes the step of automatically determining an alternate escape route for one of the communication devices in response to an indication that a previously determined escape route for the one of the communication devices is no longer viable.

In one feature, the method further includes the step of automatically disabling wireless transceivers corresponding to checkpoints along an escape in response to an indication that the escape route for the one of the communication devices is no longer viable.

As one feature, the method further includes the step of automatically determining which of a plurality of wireless communications protocols are enabled for each communications device and selecting a preferred one of the plurality of wireless communications protocols for use in communicating information to and from each of the communication devices.

In one feature, the step of wirelessly transmitting further includes automatically transmitting the same image to a communication device as long as the communication device can communicate with a wireless transmitter corresponding to one of the checkpoints along the escape route determined for the communication device. According to a further feature, the step of wirelessly transmitting further includes automatically transmitting a new image to the communication device when the wireless transmitter is no longer able to communicate with the communication device.

As one feature, the step of wirelessly transmitting further includes automatically transmitting a message to a communication device urging the person assigned to the device to hurry as long as the communication device can communicate with a wireless transmitter corresponding to one of the checkpoints along the escape route determined for the communication device.

Other features and advantages will become apparent from a review of the entire specification, including the appended claims and drawings.

DETAILED DESCRIPTION

Figure 1:
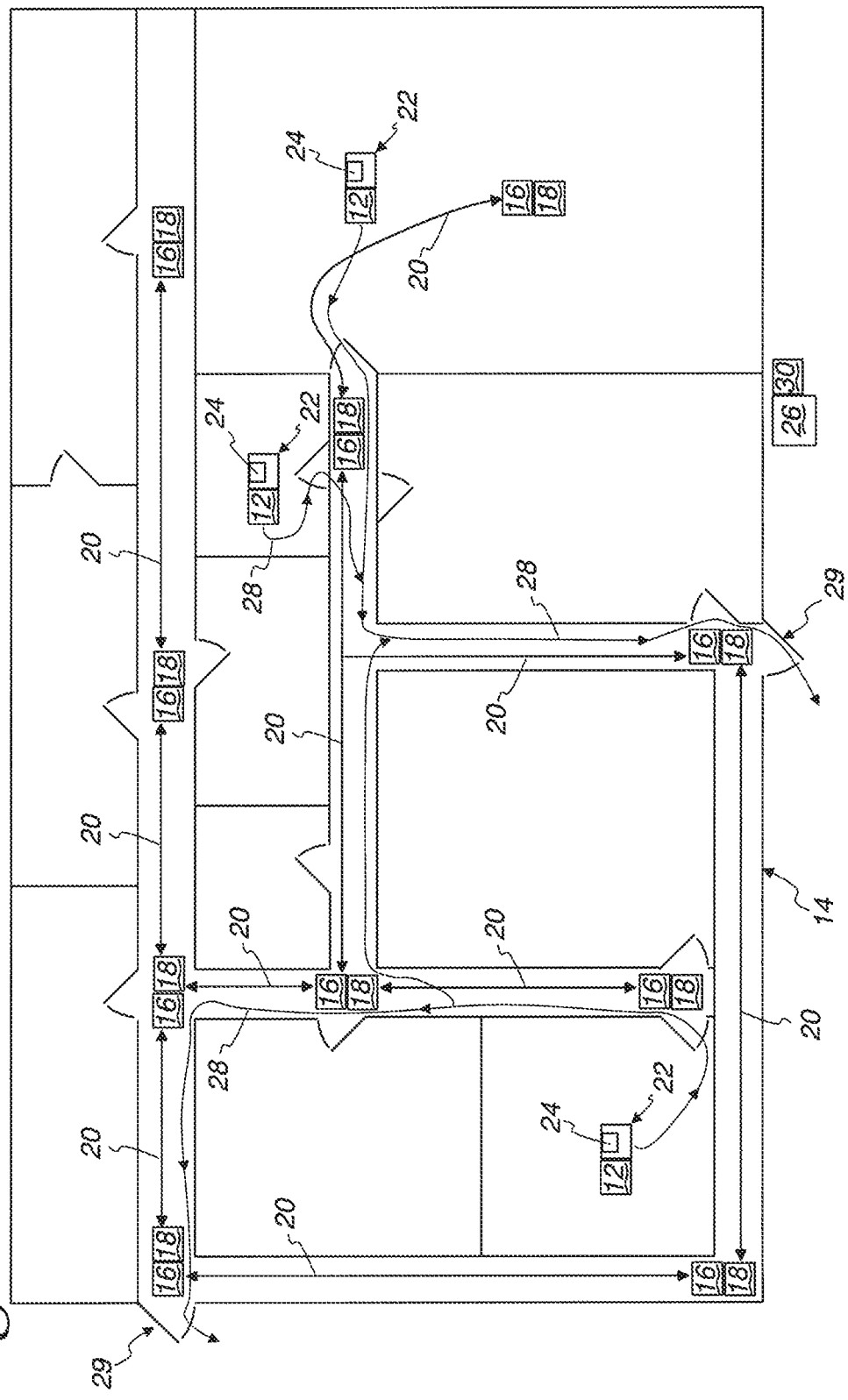
FIG. 1 is a diagrammatic representation of a system for providing a guided emergency exit to personnel within a building or other facility according to this disclosure.

With reference to FIG. 1, a system 10 is shown for providing a guided emergency exit to personnel 12 within a facility or building 14. The system 10 includes a plurality of wireless transceivers 16 located at checkpoints 18 spaced throughout the building 14, with the checkpoints 18 being connected by paths 20 that can be navigated by the personnel 12 in the building 14 to exit the building 14. The system 10 also includes a plurality of handheld wireless communication devices 22, such as smart phones, with each device 22 including a visual display 24 and being assigned to a person 12 within the building 14. The system 10 further includes a computer processor in the form of a central server 26 in operable association with the wireless transceivers 16 to communicate information to and from each of the communication devices 22 via the wireless transceivers 16. While the server 26 is shown adjacent the building 14 for purposes of illustration, it should be understood that the server 26 could be located within the building 14 or at a location remote from the building 14. The server 26 is configured to determine the location of each device 22 within the building 14 in the case of an emergency and to communicate a sequential set of visual images of an escape route (as shown diagrammatically in FIG. 1 by arrows 28 for each of the persons 12) via the wireless transceivers 16 to each of the communication devices 22 to lead the person 12 carrying the communication device 22 from checkpoint 18 to checkpoint 18 along the escape route A until the person 12 exits the building 14 via an exist 29.

The wireless transceivers 16 can be any suitable, conventional wireless transceiver, such as any conventional wireless router, configured to operate according to any suitable relatively low power radio/wireless protocol, such as wireless signals operating according to Bluetooth protocols in the ISM band from 2400 to 2800 megahertz, signals operating according to Zigbee protocols such as IEEE 802.15.4, signals operating under ultra-wide band protocols, such as IEEE 802.14.4a, and signals operating under so-called Wi-Fi or wireless local area network protocols, such as signals operating under IEEE 802.11 standards, from 2400 to 2800 megahertz, signals operating. In this regard, it is anticipated that Bluetooth protocols and/or Wi-Fi protocols will be the most often used in most applications of the system 10. The wireless communication devices 22 can be provided in the form any conventional wireless communication device configured to operate according to any of the relatively low power radio/wireless protocols mentioned above. Such devices 22 include, for example, smart phones, cellular phones, tablet computers, iPhones™, iPads™, and Itouch™ devices, and will each typically include a wireless transceiver comprising a wireless transmitter and receiver, a programmable processor, a user interface in the form of the visual display 24 and a keyboard either incorporated into the visual display 24 or as a separate element of the device 22, and a battery. The central server 26 can be in the form of any conventional and known server and will typically include one or more programmable processors, electronic databases, suitable user interfaces, and communication ports that allow the server 26 to be in operable association with each of the wireless transceivers 16, such as, for example, via hard line data connections and/or wireless data connections.

The system 10 further includes an electronic database 30 accessible by the central server, the electronic database 30 containing images of each of the checkpoints 18 and/or images of each path 20 connecting the checkpoints 18. Primary and alternate escape routes 28 are determined from every location within the building following the paths 20 from checkpoint 13 to checkpoint 80 and again stored in the database 30. The central server 26 is configured to determine a primary escape route 28 from the building 14 for each of the communication devices 22 based on the location of each communication device 22 within the building 14 and to communicate to each of the communication devices 22 a sequential set of the images of the checkpoints 18 and/or paths 20 between the checkpoints 18 along the primary escape route 28 via the wireless transceivers 16 located at the checkpoints 18 along the primary escape routes 28. In this regard, the central server 26 is configured to communicate a visual image of the path 20 from the checkpoint 18 corresponding to the transceiver 16 currently communicating with a device 22 to the next checkpoint 18 along the escape route 28, with a new visual image of the next path 20 being transmitted when a user reaches the next checkpoint 18. If the central server 26 receives an indication that one of the primary escape routes 28 is no longer viable, such as receiving a signal from a video monitor or smoke detector indicating that the escape route 28 is no longer safe, the server 26 is configured to determine an alternate escape route, such as the escape route 28' in FIG. 1, for any device 22 impacted by the non-viability of the primary escape route 28.

Figure 2:
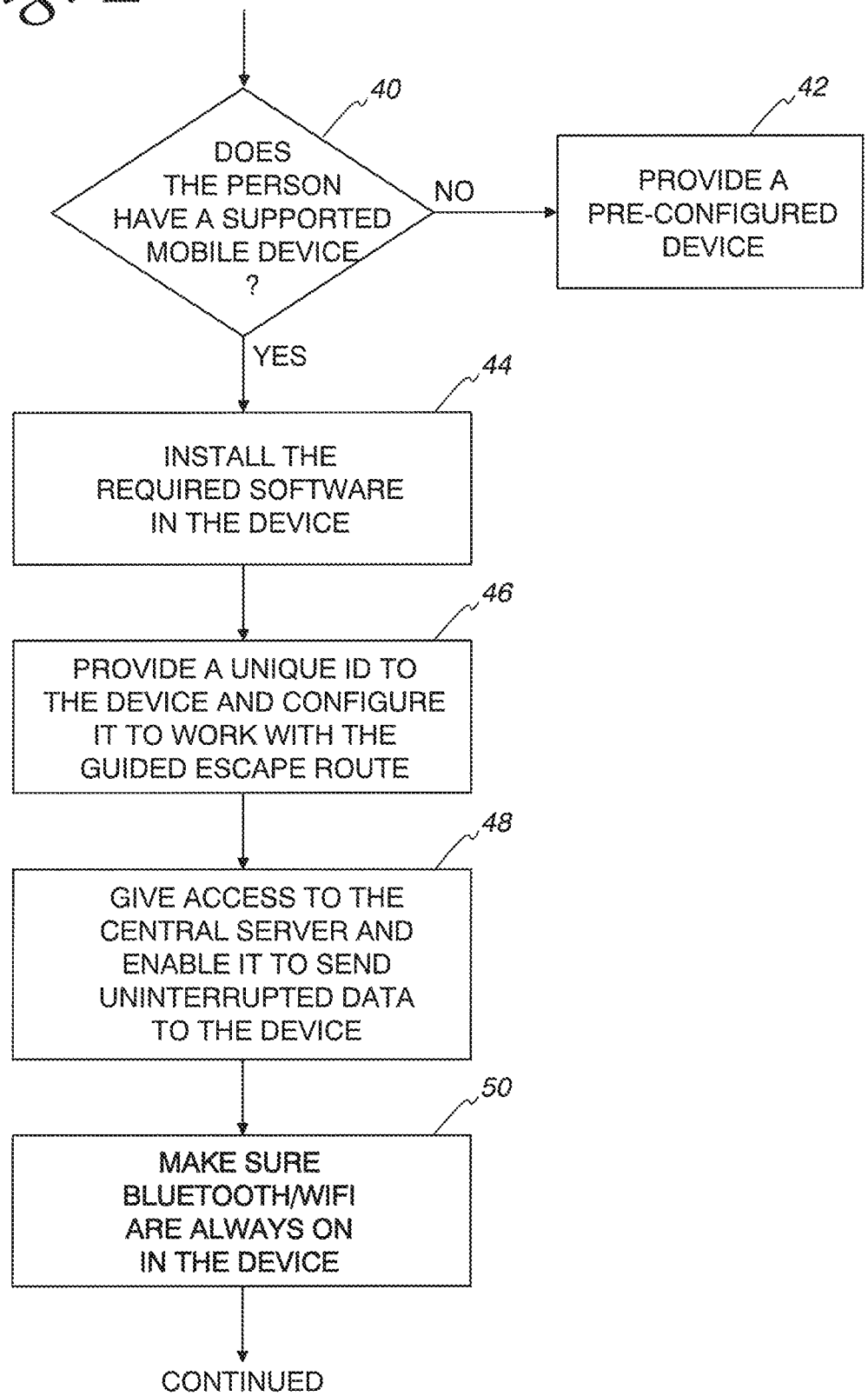
FIGS. 2 and 3 are flow charts illustrating the system and method according to the invention.

With reference to FIG. 2, according to the disclosed method, when a person 12 enters a facility or building 14 for the first time, the person will be asked if he/she has any mobile communication device 22 and if that device 22 is supported by this system, as shown at 40. If he/she does not have any device, he/she will be provided with a device 22 that has been preconfigured to work with the transceivers 16 and the central server 26 as part of the method and system 10, as shown at 42. If he/she has a supported device 22, emergency exit guiding software will be installed in the communication device 22 to allow the communication device 22 to operate with the transceiver 16 and the server 26 as part of the method and system 10, as shown at 44. In this regard, a unique ID (identifier) will be assigned to the communication device 22 and the communication device 22 will be configured to receive data from the central server 26, as shown at 46. Further in this regard, the central server 26 will be given access to the communication device 22 so that the server 26 can transmit data without any interruption or permission issues, as shown at 48, and the communication device 22 will be configured so that one or more of the relatively low power radio/wireless protocols, such as Bluetooth and Wi-Fi protocols, are always switched on (enabled) in the communication device 22 as long as the person 12 and device 22 are present in the building, as shown at 50.

Figure 3:
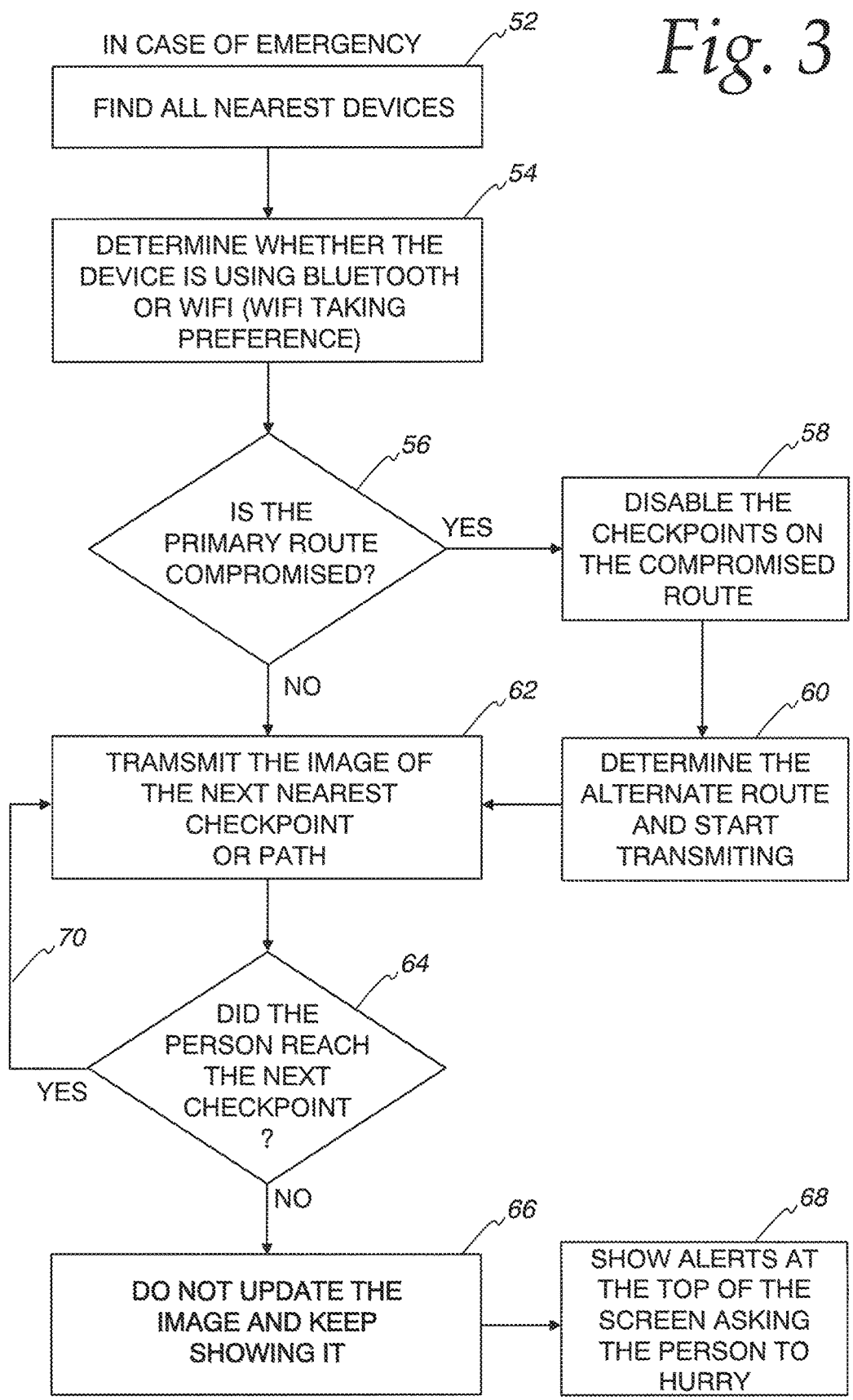

With reference to FIG. 3, further according to the disclosed method, when a person 12 needs to exit the building 14 due to an emergency, the central server 26 sends a signal to find all the communication devices 22 in the building 14 and to determine the nearest wireless transceiver 16 and associated checkpoint 18 to each of the devices 22, as shown at 52. After the communication devices 22 are found, the server 26 determines what relatively low power radio/wireless protocols are enabled for each device 22, such as whether they are Bluetooth enabled and/or Wi-Fi enabled, and uses the respective protocol to transmit the data, as shown at 54. If more than one of the protocols is enabled and the enabled protocols include Wi-Fi, it will be desirable in many applications for Wi-Fi to take preference. Before transmitting the details for each escape route 28, the server 26 determines whether the primary escape route 28 for each device 22 is compromised or not, as shown at 56. If the primary escape route 28 is compromised, all the checkpoints 18 along that route can be disabled by the server 26 (i.e., the transceivers 16 at each checkpoint 18 can be disabled by the server 26), as shown at 58. An alternate escape route 28' will be determined by the server 26 and transmitted as the preferred escape route 28, as shown at 60.

After steps 58 and 60, or if the primary escape route 28 is not compromised, the server 26 transmits real life images of the next nearest checkpoint 18 or the path 20 to the next nearest checkpoint 18 to be reached on the escape route 28 to each of the communication devices 22 based on the locations of each of the devices 22, as shown at 62. The server 26 next determines if each person 12 with a device 22 has reached the next checkpoint 18 for that device 22, as shown at 64. In this regard, the server 26 is configured to assume the person 12 has not reached the next checkpoint 18 as long as the transceiver 16 at the prior checkpoint 18 can still communicate with the communication device 22. If the person 12 has not reached the next checkpoint 18, the same image will be shown continuously, as shown at 66, and notifications will be transmitted for the person 12 to hurry, as shown at 68. If the person 12 reaches the next checkpoint 18, the transmitted image will be updated with the next image for the escape route 28, as shown at 70, and this will be repeated until the person 12 exits the building 14 via the escape route 28.

It should be appreciated that while specific embodiments of the system and method 10 have been shown herein for purposes of illustration, the method and system 10 can take on many forms according to the disclosure. For example, while FIG. 1 discloses a certain number of the transceivers 16 and checkpoints 18 being located at intersections of pathways, the most desirable locations for the transceiver 16 and checkpoints 18 can vary depending upon the particular parameters of each application. By way of further example, while the illustrated method has been described as providing alternate escape routes, in some applications this feature may not be incorporated. As yet a further example, while the illustrated method shows that a message can be transmitted to the person urging the person to hurry, in some applications this feature may not be incorporated. Accordingly, no limitation to specific details is intended unless specifically recited in an appended claim.

The invention claimed is:

1. A system for providing a guided emergency exit to personnel within a building, the system comprising:
   a plurality of wireless transceivers located at checkpoints spaced throughout the building, the checkpoints connected by paths that can be navigated by personnel in the building to exit the building;

a plurality of handheld wireless communication devices, each communication device including a visual display and being assigned to a person within the building; and a central server in operable association with the wireless transceivers to communicate information to and from each of the communication devices via the wireless transceivers, the central server being configured to determine location of each communication device within the building in case of an emergency and to communicate a sequential set of visual images of an escape route via the wireless transceivers to each of the communication devices to lead the person carrying the communication device from checkpoint to checkpoint along the escape route until the person carrying the communication device exits the building;

wherein the central server is configured to disable the wireless transceivers along the escape route in response to an indication that the escape route is no longer viable.

2. A method for providing a guided emergency exit to personnel within a building, the method comprising steps of:

automatically determining location of each of a plurality of wireless communication devices within the building in response to an emergency, each of the communication devices being assigned to a person;

determining an escape route from the building for each of the communication devices based on the location of the communication device within the building and available paths from that location to a safe exit from the building;

wirelessly transmitting a sequential series of images to each of the communication devices to guide the person assigned to the communication device from checkpoint to checkpoint along the escape route until the person assigned to the communication device safely exits the building; and wherein the step of wirelessly transmitting comprises sequentially transmitting the sequential series of images from wireless transceivers corresponding to the checkpoints, each transceiver transmitting one of the images corresponding to a path from the checkpoint corresponding to the transceiver to a next checkpoint along the escape route in response to an indication that the escape route for the one of the communication devices is no longer viable.

* * * * *